United States Patent [19]

Dougherty, Jr. et al.

[11] Patent Number: 4,807,387
[45] Date of Patent: Feb. 28, 1989

[54] QUICK CHANGE FISHING LURE

[76] Inventors: C. Clark Dougherty, Jr., 2301 Old Farm Rd., Edmond, Okla. 73013; Clifford C. Dougherty, III, 1400 E. Interurban Way, Edmond, Okla. 73034

[21] Appl. No.: 161,854

[22] Filed: Feb. 29, 1988

[51] Int. Cl.$^4$ ............................................. A01K 85/00
[52] U.S. Cl. ................................ 43/42.09; 43/42.06; 43/42.22
[58] Field of Search ............... 43/42.06, 42.09, 42.16, 43/42.31, 42.22

[56] References Cited

U.S. PATENT DOCUMENTS

| | | | |
|---|---|---|---|
| 2,494,384 | 1/1950 | Gadzinski et al. | 43/42.22 |
| 2,659,176 | 11/1953 | Wenger | 43/42.31 |
| 2,665,515 | 1/1954 | Frantello | 43/42.09 |
| 2,680,927 | 6/1954 | Napier et al. | 43/42.22 |
| 2,883,785 | 4/1959 | Croft | 43/42.09 |
| 3,091,883 | 6/1963 | Hufford | 43/42.08 |
| 3,137,960 | 6/1964 | Sharp | 43/42.09 |
| 3,205,609 | 9/1965 | Knapton | 43/42.09 |
| 3,608,228 | 9/1971 | Borresen et al. | 43/17.6 |
| 3,708,903 | 1/1973 | Bercz et al. | 43/17.6 |
| 4,183,164 | 1/1980 | Young et al. | 43/42.09 |
| 4,697,378 | 10/1987 | Tunstall | 43/42.09 |

Primary Examiner—M. Jordan
Attorney, Agent, or Firm—Laney, Dougherty, Hessin & Beavers

[57] ABSTRACT

A fishing lure having deflector and body parts which are quickly interchangeable with other deflector and body parts is provided. In the use of the lure, the requirement of disconnecting and reconnecting the fishing line in order to change lure color, submergence depth and the like is obviated. The lure is comprised of a body having an opening at the front head portion thereof which includes an internal rearwardly facing shoulder, and a deflector having a protuberant portion adapted to fit within the opening which includes a movable lug portion forming a forwardly facing shoulder thereon for coating with the rearwardly facing shoulder in the opening whereby the deflector is selectively retained in attachment with the body.

14 Claims, 3 Drawing Sheets

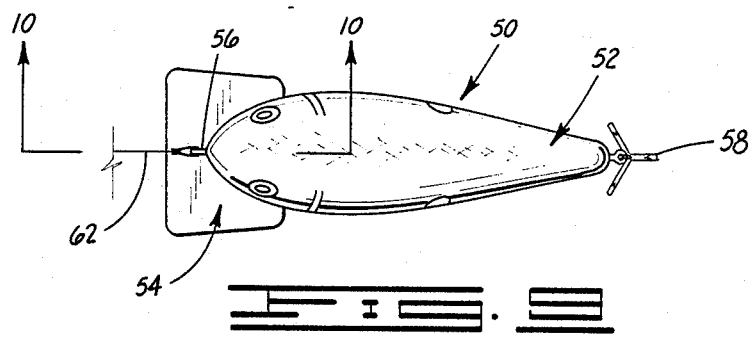
FIG. 9
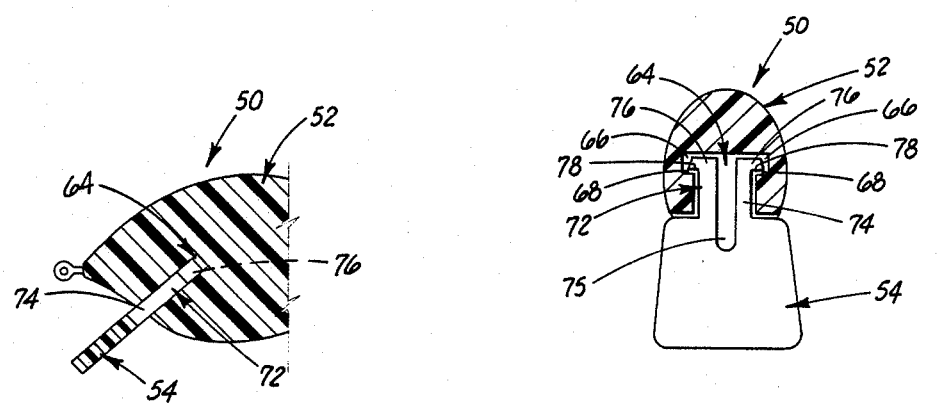
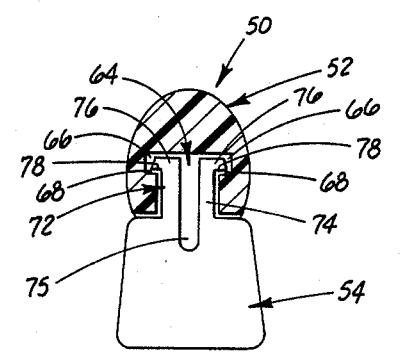
FIG. 10  FIG. 11
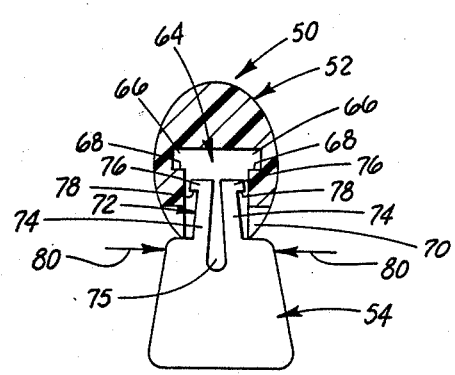
FIG. 11A
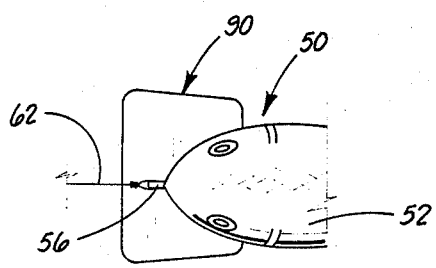 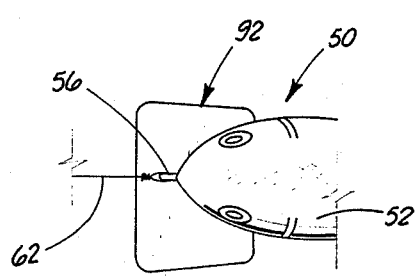
FIG. 12  FIG. 13

QUICK CHANGE FISHING LURE

BACKGROUND OF THE INVENTION

1. Field of the Invention

The present invention relates to a quick change fishing lure, and more particularly, but not by way of limitation, to a fishing lure having deflector and body parts which are quickly interchangeable with other deflector and body parts.

2. Description of the Prior Art

A great variety of fishing lure designs have been developed heretofore. One design type which has gained appreciable popularity is generally comprised of a body having the appearance of a minnow or shad, i.e., the body has a front head portion and a tail portion with simulated eyes, gills and fins painted thereon. In addition, such lures include a submergence inducing deflector attached to the body at the front head portion thereof. The position, size and shape of the deflector determine the particular depth at which the lure swims, and together the fish-like shape of the body causes the lure to wriggle as it is pulled through the water.

Some of the prior fishing lures of the type described above have included detachable or interchangeable parts. For example, U.S. Pat. No. 4,183,164 discloses a fishing lure having a lip member (deflector) which is detachable from the lure body when an elongated screw is removed from the body. The lip member can be interchanged to affect the depth to which the lure dives when fished. U.S. Pat. No. 3,091,883 is directed to a fishing lure comprised of separably connectible component parts which are capable of being manually assembled and disassembled to vary the appearance and affect of the lure.

Notwithstanding the fact that prior lures have been capable of part disattachment or disassembly, it has still generally always been necessary to disconnect the fishing line from the lure and then reconnect the fishing line to that lure or another lure when it is desired to change the depth of submergence of the lure, change the color of the lure, change the shape of the lure body, etc.

By the present invention an improved fishing lure having deflector and body parts which are quickly interchangeable with other deflector and body parts whereby the requirement of disconnecting and reconnecting the fishing line in order to change lure color, submergence depth and the like is obviated.

SUMMARY OF THE INVENTION

A fishing lure having submergence inducing deflector and body parts which are quickly interchangeable with other deflector and body parts is provided. The fishing lure is comprised of a body having a front head portion and a tail portion and having an opening at the front head portion which includes at least one internal rearwardly facing shoulder formed therein. A deflector having a protuberant portion adapted to fit within the opening of the body is connected to the body by means of the protuberant portion which is disposed within the opening. The protuberant portion of the deflector includes at least one lug portion forming a forwardly facing shoulder thereon for coacting with the rearwardly facing shoulder in the opening and selectively retaining the deflector in attachment with the body. The lug portion of the deflector is capable of movement relative to the forwardly facing shoulder in the opening in the body whereby the body and deflector can be selectively and quickly attached and disattached. Hook means are attached to the body, and fishing line connecting means are connected either to the head portion of the body or to the deflector.

When the fishing line connecting means are attached to the deflector, the body of the fishing lure can be quickly interchanged with bodies of different designs, colors or shapes without the requirement that the fishing line be disconnected and then reconnected. When the fishing line connecting means is attached to the body, the deflector can be quickly changed to a different size or shape of deflector whereby the fishing lure submerges to a deeper or shallower depth, and runs straight or to the side when moved through the water without disconnecting or reconnecting the fishing line.

It is, therefore, a general object of the present invention to provide a fishing lure having detachable parts that can be quickly interchanged.

A further object of the present invention is the provision of a fishing lure which can be quickly changed in body color and/or body shape without the necessity of disconnecting and reconnecting the fishing line thereto.

Yet a further object of the present invention is the provision of a fishing lure having a submergence inducing deflector which can be quickly interchanged with deflectors of different size and design to achieve desired results without disconnecting and reconnecting the fishing line.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 9 is a top view of the fishing lure of FIG. 7.

FIG. 10 is a cross-sectional view taken along line 10—10 of FIG. 9.

FIG. 11 is a cross-sectional view taken along line 11—11 of FIG. 7.

FIG. 11a is a cross-sectional view similar to FIG. 11 but showing the deflector in a partially removed position.

FIG. 12 is a partial top view of the fishing lure of FIG. 7 including a deflector of different design.

FIG. 13 is a partial top view of the fishing lure of FIG. 7 including a deflector of yet another design.

DETAILED DESCRIPTION OF PREFERRED EMBODIMENTS

Figure 1:
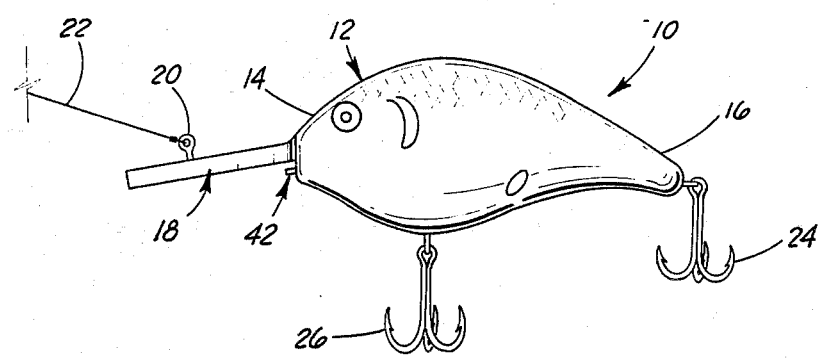
FIG. 1 is a side elevational view of one embodiment of the fishing lure of the present invention.
Figure 2:
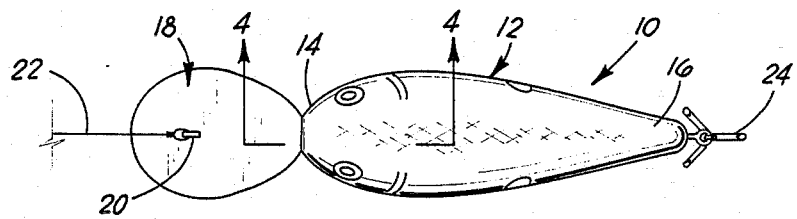
FIG. 2 is a top view of the fishing lure of FIG. 1.
Figure 3:
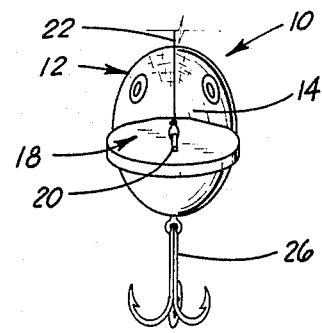
FIG. 3 is a front view of the fishing lure of FIG. 1.

Referring now to the drawings and particularly to FIGS. 1 through 6, a fishing lure of the present invention is illustrated and generally designated by the numeral 10. The lure 10 is comprised of a body 12 having the overall shape and appearance of a minnow. That is, the body 12 includes a front head portion 14 and a tail portion 16 with fish markings painted thereon. A submergence inducing deflector 18 is attached to the body 12 at the front head portion 14 thereof. Fishing line connecting means 20, usually a metal eyelet and connecting post, are attached to the deflector 18 and a fishing line 22 is connected thereto. In the usual arrangement, a three-barb fishhook 24 (commonly known as a treble hook) is connected to the body 12 at the rearward end thereof, and a second treble hook 26 is connected to the bottom of the body 12 at an intermediate position thereon.

Figure 4:
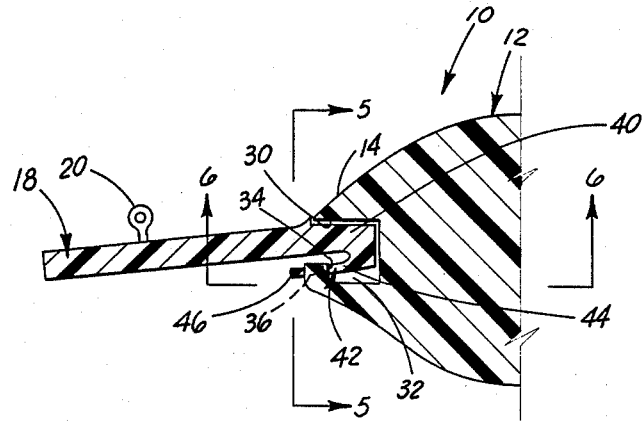
FIG. 4 is an enlarged cross-sectional view taken along line 4—4 of FIG. 2.
Figure 5:
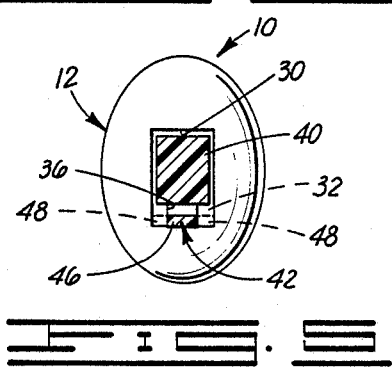
FIG. 5 is a cross-sectional view taken along line 5—5 of FIG. 4.
Figure 6:
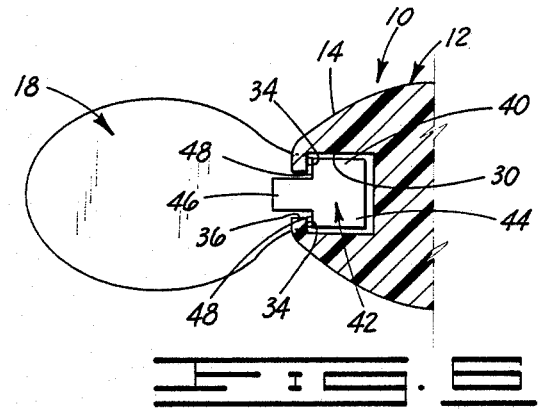
FIG. 6 is a cross-sectional view taken along line 6—6 of FIG. 4.
Figures 7, 8:
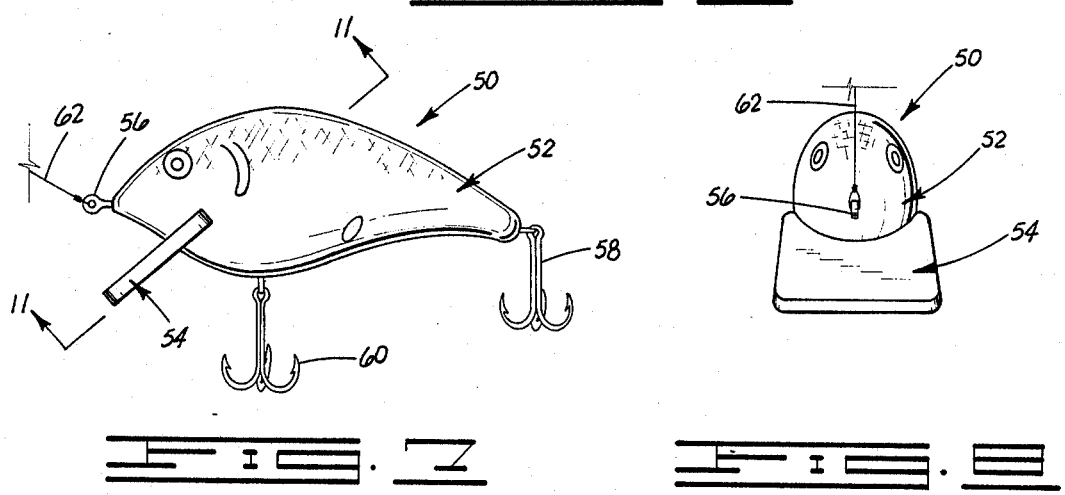
FIG. 7 is a side elevational view of an alternate embodiment of the fishing lure of the present invention.
FIG. 8 is a front view of the fishing lure of FIG. 7.

As shown best in FIGS. 4 through 6, the lure body 12 includes an opening 30 formed therein at the front head portion 14 thereof. The opening 30 is substantially rectangular in cross sectional shape with the longitudinal axis thereof positioned generally parallel to the longitudinal axis of the body 12. A rectangular recess 32 is provided in the lower side of the opening 30 which forms a rearwardly facing shoulder 34 within the interior of the opening 30. A second longitudinal recess 36 which is contiguous with the recess 32, but of a smaller width, is disposed in the forward portion of the lower side of the opening 30. The recess 36 divides the shoulder 34 into two spaced portions as best shown in FIG. 6.

The deflector 18 includes a protuberant portion 40 at the rearward end thereof adapted to fit within the opening 30 of the body 12. That is, the protuberant portion 40 of the deflector 18 is also of rectangular cross-sectional shape, and is of a size such that it fits snugly within the opening 30 of the body 12.

The protuberant portion 40 includes an arm member 42 pivotally connected at the rearward or internal end thereof which extends forwardly and downwardly into the recess 32 and through the recess 36 to a point just outside the opening 30. The arm member 42 is biased downwardly, i.e., constantly urged towards a downward position. In a preferred embodiment, the deflector 18 is formed of plastic material with the arm member 42 integrally attached to the protuberant portion 40. As a result of being formed of the plastic material, the arm member 42 is flexible and can be bent upwardly to a position adjacent the bottom of the deflector 18 when an upward force is applied thereto as shown by the arrow 43 in FIG. 4a.

Figure 4A:
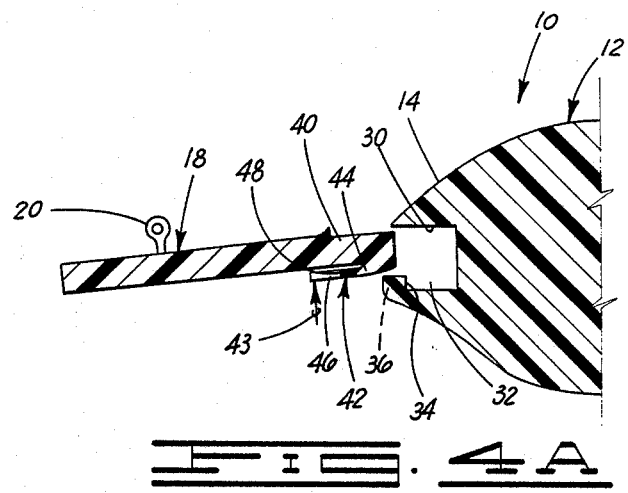
FIG. 4a is a view similar to FIG. 4 but showing the deflector in a partially removed position.

As best shown in FIGS. 5 and 6, the arm member 42 is of a width approximately equal to the width of the protuberant portion 40 at its rearward end 44. The forward end portion 46 of the arm member 42 is of a reduced width whereby opposite lateral lug portions are included on the arm member 42 forming forwardly facing shoulders 48 thereon. The forwardly facing shoulders 48 contact and coact with the rearwardly facing shoulders 34 of the body 12 to selectively retain the deflector 18 in attachment with the body 12. That is, as illustrated in FIGS. 4, 5 and 6, when the protuberant portion 40 of the deflector 18 is fully inserted within the opening 30 of the body 12, the rearward portion 44 of the arm member 42 is positioned within the recess 32, the forwardly facing shoulders 48 of the arm member 42 contact the rearwardly facing shoulders 34 of the body 12 and the forward portion 46 of the arm member 42 is positioned within and extends through the recess 6. As illustrated in FIG. 4a, when the deflector 18 is removed from attachment to the body 12, the forward end 46 of the arm member 42 is compressed towards the bottom of the deflector 18 whereby the shoulders 48 are moved out of engagement with the shoulders 34, and the protuberant portion 40 of the deflector 18 is withdrawn from the opening 30.

In use of the fishing lure 10, a deflector 18 of a desired size and shape whereby the lure 10 is submerged to a desired depth when pulled through the water, etc., is selected. The fishing line 22 is connected to the eyelet 20, and fishing is commenced in the normal manner using the lure 10. When it is desired to use another body of differing color, differing shape, etc., the arm member 42 of the deflector 18 is compressed against the bottom surface of the deflector 18 and the body 12 is disattached from the deflector 18. The different body is then snapped onto the deflector 18 by inserting the protuberant portion 40 of the deflector 18 into the opening 30 of the different body 12 whereby the rearward portion 44 of the arm member 42 is snapped into the recess 32, the lug portions 48 contact the shoulders 34 and the forward portion 46 of the arm member 42 is positioned within the recess 36 as illustrated in FIG. 4. Thus, by using the fishing lure 10, a variety of bodies of different color, shape and/or design can be quickly interchanged without the necessity of disconnecting and reconnecting the fishing line 22 to the fishing lure 10.

As will be understood by those skilled in the art, the protuberant portion 40 of the deflector 18 and the opening 30 of the body 12 can take a variety of cross-sectional shapes other than rectangular, e.g., triangular, circular or polygonal. Preferably, however, the protuberant portion 40 of the deflector 18 and the opening 30 of the body 12 are formed of complementary cross sectional shapes which include angularly intersecting sides. Such intersecting sides resist relative movement between the deflector 18 and body 12, and generally make the connection between the deflector 18 and body 12 more rigid.

Referring now to FIGS. 7 through 13, an alternate embodiment of the fishing lure of the present invention is illustrated and generally designated by the numeral 50. The fishing lure 50 is similar to the fishing lure 10 described above in that it includes a body 52 which simulates a minnow, and a submergence inducing deflector 54 is attached thereto at the front end portion thereof. The fishing lure 50 differs from the fishing lure 10 in that the fishing line connecting eyelet 56 is attached to the front end of the body 52 instead of to the deflector 54. Further, the deflector 54 is positioned at the lower front end portion of the body 52. Hooks 58 and 60 are connected to the body 52, and a fishing line 62 is connected to the eyelet 56.

As best shown in FIGS. 10 through 11a, an opening 64 is provided in the front head portion of the body 52 for receiving the deflector 54. Like the opening 30 described above, the opening 64 can have a variety of cross-sectional shapes, but it preferably includes angular intersecting sides, and most preferably, is substantially rectangular in cross-sectional shape. A pair of opposed lateral recesses 66 is positioned within the opening 64 which forms a pair of rearwardly facing shoulders 68 therein. Lateral cut-outs 70 are provided at the bottom portion of the opening 64 to accommodate the lateral portions of the deflector 54.

The deflector 54 includes a protuberant portion 72 positioned at the rearward end thereof. The protuberant portion 72 is comprised of a pair of elongated leg members 74 having laterally extending lug portions 76 formed thereon. The lug portions 76 provide forwardly facing shoulders 78 which engage the rearwardly facing shoulders 68 within the opening 64 as shown in FIG. 11. The arm members 74 are separated by a longitudinal slot 75 formed in the deflector 54. The slot 75 extends longitudinally towards the forward end of the deflector 54 a sufficient distance to allow the deflector 54 to be compressed laterally and removed from the opening 64 in the body 52. More specifically, as shown in FIG. 11a, the deflector 54 can be manually compressed at the points indicated by the arrows 80 which causes the legs 74 to be moved towards each other and the lug portions 76 of the legs 74 to be withdrawn from the recesses 66 within the body 52. The protuberant portion 72 of the deflector 54 is then withdrawn from the opening 64.

In use of the fishing lure 50, a deflector 54 of desired size and shape is initially attached to the body 52 by inserting the protuberant portion 72 within the opening 64 of the body 52 whereby the lug portions 76 of the legs 74 are snapped into the recesses 66 within the opening 64. The fishing line 62 is then tied to the eyelet 56 of the body 52, and fishing is commenced. When it is desired to substitute an alternate deflector 54 of different size or shape for the initial deflector 54, the initial deflector 54 is compressed at the points indicated by the arrows 80 whereby the lug portions 76 of the legs 74 are moved towards each other and are removed from the recesses 66. This, in turn, causes the forwardly facing shoulders 78 of the deflector 54 to be moved out of contact with the rearwardly facing shoulders 68 of the body 52. The initial deflector 54 is then withdrawn from the opening 64 and replaced with a selected different deflector 54.

As is well understood by those skilled in the art, the initial deflector 54 may be changed in favor of a deflector having more or less surface area whereby the fishing lure 50 is caused to submerge to a deeper or shallower depth while being pulled through the water. In addition, as illustrated in FIG. 12, the initial deflector 54 may be changed to a deflector 90 which includes a greater surface area on the right side of the fishing lure as compared to the left side. This imbalance causes the fishing lure to swim to the right as it is pulled in. As shown in FIG. 13, a deflector 92 can be substituted for the deflector 54 which includes more surface area on the left side than on the right which causes the fishing lure 50 to swim to the left. Fishing has become extremely popular as both a hobby and a sport. The color, shape and design of a fishing lure and the way that a fishing lure moves through the water are very important. The particular color, shape, design and movement of a lure that are attractive to fish frequently change with changes in water conditions, weather conditions and other factors.

The fishing lure of the present invention achieves many advantages not achieved by fishing lures developed heretofore. The structure of the fishing lure allows critical parts of the lure to be quickly interchanged. The embodiment shown in FIGS. 1-6 allows a variety of bodies of different color, shape and/or design to be quickly interchanged without the necessity of disconnecting and reconnecting the fishing line to the lure. This allows fishermen to rapidly determine the particular color, shape, design and movement that are attractive to fish in a particular instance. The embodiment shown in FIGS. 7-13 allows various types of deflectors to be quickly interchanged. This allows fishermen to rapidly vary the depth at which the lure submerges and/or direction to which the lure swims while being pulled through the water. All embodiments of the fishing lure of the present invention can be easily and inexpensively manufactured.

Thus, the fishing lure of the present invention is well adapted to carry out the objects and attain the ends and advantages mentioned as well as those inherent therein. While numerous changes in the arrangement and construction of parts will suggest themselves to those skilled in the art, such changes are encompassed within the scope of this invention as defined by the appended claims.

What is claimed is:

1. In a fishing lure having a body, a submergence inducing deflector attached to the body, fishing line connecting means attached thereto and hook means attached thereto, the improvement whereby the deflector and body can be quickly interchanged with other deflector and body parts comprising:

said body having a front head portion and a tail portion and having an opening at the front head portion thereof, said opening including at least one internal rearwardly facing shoulder formed therein; and said deflector including a protuberant portion adapted to fit within said opening in said body having at least one lug portion forming a forwardly facing shoulder thereon for coacting with said rearwardly facing shoulder in said opening and retaining said deflector in attachment with said body, said lug being capable of selective movement relative to said forwardly facing shoulder in said opening whereby said body and deflector can be selectively attached and disattached.

2. The fishing lure of claim 1 wherein said opening in said body and said protuberant portion of said deflector have angularly intersecting sides.

3. The fishing lure of claim 2 wherein said rearwardly facing shoulder in said opening is formed by at least one recess positioned within said opening.

4. The fishing lure of claim 3 wherein said lug portion forming a forwardly facing shoulder is connected to an outwardly biased movable part of said protuberant portion and extends within said recess in said opening of said body.

5. The fishing lure of claim 1 wherein said fishing line connecting means are attached to said deflector.

6. The fishing lure of claim 1 wherein said fishing line connecting means are attached to said body.

7. A fishing lure having deflector and body parts which are quickly interchangeable with other deflector and body parts comprising:

a body having a front head portion and a tail portion and having a longitudinally positioned opening with angularly intersecting sides formed therein at the front head portion thereof, said opening including at least one internal rearwardly facing shoulder formed therein;

a deflector having a forward end and a rearward end, said rearward end including a protuberant portion having angularly intersecting sides corresponding to the sides of said opening in said body disposed in said opening and including a movable part having a lug portion forming a forwardly facing shoulder thereon which coacts with said rearwardly facing shoulder of said opening and selectively retains said deflector in attachment with said body;

hook means attached to said body; and fishing line connecting means attached to said deflector.

8. The fishing lure of claim 7 wherein said opening in said body and said protuberant portion of said deflector are substantially rectangular in shape.

9. The fishing lure of claim 8 wherein said rearwardly facing shoulder in said opening is formed by at least one recess positioned within said opening.

10. The fishing lure of claim 9 wherein said movable part is an outwardly biased arm member pivoted to said protuberant portion of said deflector and said lug portion thereof extends within said recess in said opening of said body.

11. A fishing lure having deflector and body parts which are quickly interchangeable with other deflector and body parts comprising:

a body having a front head portion and a tail portion and having an opening with angularly intersecting sides formed therein at the front head portion thereof, said opening including at least one internal rearwardly facing shoulder formed therein;

a deflector having a forward end and a rearward end, said rearward end including a protuberant portion having angularly intersecting sides corresponding to the sides of said opening in said body disposed in said opening and including a movable part having a lug portion forming a forwardly facing shoulder thereon which coacts with said rearwardly facing shoulder of said opening and selectively retains said deflector in attachment with said body;

hook means attached to said body; and fishing line connecting means attached to said front head portion of said body.

12. The fishing lure of claim 11 wherein said opening in said body and said protuberant portion of said deflector are substantially rectangular in shape.

13. The fishing lure of claim 12 wherein said rearwardly facing shoulder in said opening is formed by at least one recess positioned within said opening.

14. The fishing lure of claim 13 wherein said movable part of said protuberant portion of said deflector is outwardly biased and said lug portion thereof extends within said recess in said opening of said body.

* * * * *